United States Patent [19]

Moon

[11] 4,199,680
[45] Apr. 22, 1980

[54] METHOD OF TREATING AND LOGGING WELLS

[75] Inventor: Keith E. Moon, Odessa, Tex.

[73] Assignee: Cardinal Surveys Company, Odessa, Tex.

[21] Appl. No.: 851,097

[22] Filed: Nov. 14, 1977

[51] Int. Cl.² ............................................. G01V 5/00
[52] U.S. Cl. ................................................ 250/260
[58] Field of Search ............... 250/259, 260, 432 PD; 166/280, 308

[56] References Cited

U.S. PATENT DOCUMENTS

| | | | |
|---|---|---|---|
| 2,951,535 | 9/1960 | Mihram et al. | 166/280 |
| 2,968,721 | 1/1961 | Shapiro et al. | 250/432 PD |
| 3,002,091 | 9/1961 | Armstrong | 250/259 |
| 3,129,331 | 4/1964 | Bourne, Jr. et al. | 250/260 |
| 4,071,756 | 1/1978 | Casad | 250/259 |

Primary Examiner—Alfred E. Smith
Assistant Examiner—Janice A. Howell
Attorney, Agent, or Firm—Gerald G. Crutsinger; John F. Booth; Harry C. Post, III

[57] ABSTRACT

A method of logging and treating a well to stimulate production from and to efficiently increase acceptance of fluids in the well strata by controlled and selected treatment of formations in the well. The logging method utilizes radioactive materials which are mixed with a macroreticular ion exchange resin having an effective size of between 0.10 and 1.00 millimeters which is pumped into the pressure side of the frac line of the well to mix with pressurized fluid being pumped into the well. The radioactive material preferably has a half-life of less than 150 days and may be introduced in staged stimulation of the well or in an after treatment logging process.

12 Claims, 4 Drawing Figures

METHOD OF TREATING AND LOGGING WELLS

BACKGROUND OF THE INVENTION

In acidizing or fracturing a well, large volume, high pressure pumps inject a treatment solution into a line leading to the well head generally referred to as a frac line. The solution is generally chemicals mixed in water or gel-water and sand. The sand acts as a propping agent such that when the pressure opens up the earth's strata, the sand keeps the strata open.

Logging is utilized in various wells which helps determine the effectiveness and necessity of stimulating the well with fracturing materials or acid materials to stimulate the flow of fluid from the well. Heretofore, radioactive material was coated on sand which was sterilized and mixed in the blender which mixes the fracturing material and flows into the lower pressure side of the pumps into the well. This causes contamination of the pumps such that the pumps cannot be used for other materials. The pumps become radioactively hot causing significant safety problems around the well in the handling of the radioactive material. In addition, this creates problems with amount of radioactive material placed in the well and gives uncontrolled and varying results in the logging process.

Further radioactive materials heretofore used in logging wells have half-lives of around 200 to 300 days which made the use of these materials undesirable because the well had to be shut in for several days because it was radioactively hot and could not have fluids flowing therefrom into the normal pipeline. In addition, it is difficult to pump the radioactive coated sand into the well except through the blender and treatment pumps without large quantities of liquids, such as water or gel water which dilutes the radioactive materials which make it difficult to receive accurate results.

Heretofore, attempts to log wells have been based on temperature readings which are difficult to use to determine the flow of fluid within the well since the temperature reading will not give accurate results of the flow of fluid behind the well casing.

Heretofore, since radioactive materials were coated on sand it was uneconomically feasible to pump the materials in the pressure side of the frac line to the well.

SUMMARY

I have devised a method of logging and treating wells utilizing an ion exchange resin as a carrier for radioactive materials having a half-life of 150 days or less for injection into the pressure side of the line to the well for accurate logging of fluid flow within the well formation.

The process utilizes a macroreticular ion exchange resin as a media to carry the radioactive materials to the point of interest. The resins preferably fall into one of the following groups: sulfonic, carboxylic, quaternary ammonium, or polystyrene polyamine in aqueous or non-aqueous solutions. The resin size should be between 0.1 to 1.00 millimeters or 10 to 400 mesh and withstand temperatures up to 350 degrees F. A high pressure pump such as a low volume, piston pump injects the ion resin, previously mixed with a radioactive material, into the pressure side of the frac line to the well. The resin readily mixes with the frac material, providing a homogenious solution which affords accurate readings within the well.

The ion exchange resin with the radioactive material mixed therewith flows into the well and out through perforations in the well casing into the strata formation from which the fluid is flowing.

In utilizing the staged stimulation method of fracing or acidizing a well, a log is first made of the well after it has been shut in for approximately 24 hours. This provides a base gamma-ray level reading. A dummy solution such as water or a gel-water is pumped into the frac line and the ion exchange resin is injected simultaneously into the frac line. A log is then recorded which will show where fluid is flowing at present. Depending upon the results, it may be desirable to plug certain locations of flow temporarily by using rock salt or various other plugs which are temporary. This would allow a more effective utilization of the treatment where it is desired to stimulate flow. After the appropriate locations are determined and the undesired locations plugged, the main fracturing fluid is pumped into the well and the radioactive resin is pumped into the line to tag the material. A log may be taken after the material has reacted. A second fracturing solution may be pumped into the well with a second log to determine the results of the fracturing solution if deemed necessary.

A primary object of the invention is to provide a carrier for carrying radioactive materials into the well which has a low specific gravity yet has physical characteristics similar to that of sand such that it may be easily pumped into the pressure side of the line to the well.

Another object of the invention is to provide a carrier for radioactive material which is readily adapted to be pumped into the pressure side of the frac line into the well with standard pumping equipment readily available.

A still further object of the invention is to provide a radioactive material which has a half-life of 150 days or less with the ion exchange resin such that the well is radioactively hot a minimum of time which maximizes safety of the well and minimizes shut in time.

A still further object of the invention is to provide a method of logging a well which is readily adapted for use in staged stimulation of the well by using shorter half-life material with the ion exchange resin to maximize efficiency and use the materials in fracturing or acidizing the well.

Other and further objects of the invention are readily apparent upon considering in detail the specification and drawings annexed hereto.

DESCRIPTION OF THE DRAWINGS

Drawings of a preferred embodiment of the invention are annexed hereto so that the invention may be better and more fully understood; in which.

Numeral references are used to designate the various elements and like numerals are used to designate like elements through the various figures of the drawing.

DESCRIPTION OF A PREFERRED EMBODIMENT

This invention is directed toward a method of treating wells drilled into the earth's strata and determining the effects of that treatment by using radioactive materials to trace the flow of fluids. This radioactive material is carried by an ion exchange resin during the process of treating the well as will be more fully explained hereinafter.

Figure 1:
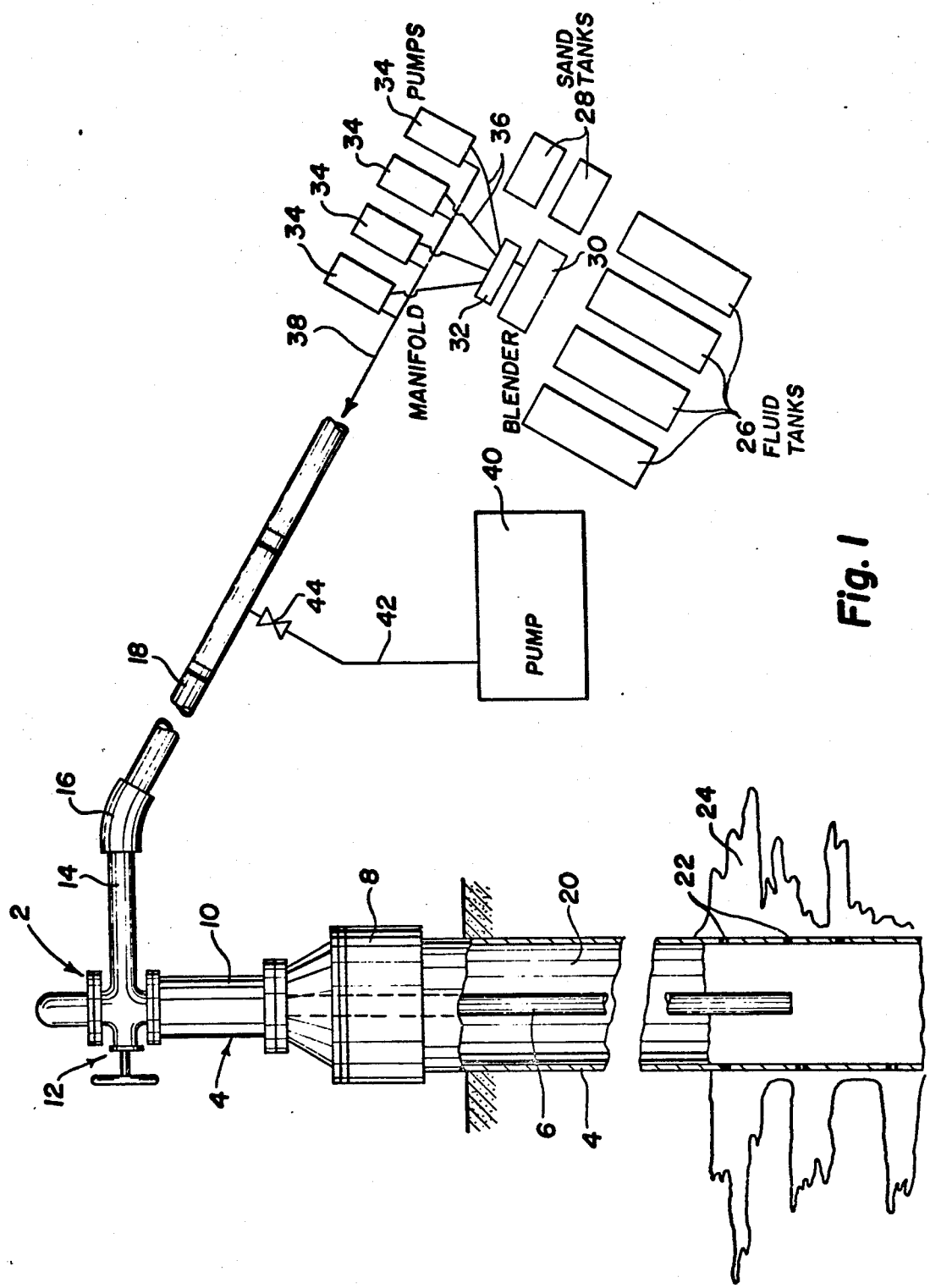
FIG. 1 is a diagrammatic view of the fracturing and logging equipment attached to a typical well.

FIG. 1 diagrammatically illustrates a typical well 2 having a casing 4 and a tubing 6 therein having axes which coincide. A casing head 8 is secured by a spool coupling 10 at the well head 4. A valve 12 controls the flow through tubing 6 and the flow through inlet conduit 14 which is connected by coupling 16 to frac line 18.

The casing 4 has an annulus 20 which communicates with perforations 22 formed through the wall of the casing at various depths within the well. The perforations 22 communicate with what is generally referred to as channels or voids 24 formed in the earth's strata where the oil or gas seeps into the annulus 20 of casing 4 through perforations 22.

Methods of stimulating a well to produce more include such methods commonly known as acidizing and sand fracturing. Both processes are well known in the art and generally use a fluid such as water or gel-water to carry the sand and/or acid into the well 2.

If the well is not producing because of collaspe of the earth's strata behind the well casing 4, sand fracturing is generally used. Water is stored in tanks 26 and mixed with a fine sand from sand tank 28 in a blender 30. After mixing, the treatment solution is transferred to an intake manifold 32 which communicates with the intake of the large volume, piston pumps 34.

The number of pumps 34 is generally dependent on the size of the well and amount of fluid or treatment solution to be pumped. The outlet of pumps 34 communicate with frac line 18 through line 38. Therefore, the frac line 18 becomes pressurized from line 38 to the well 2.

If the well 2 is to be acidized, acid is mixed with the water in blender 30 and also possibly sand is mixed therein.

Once the treatment solution is pumped into the well under high pressure the earth's strata will generally open up and the sand will provide a porous material to maintain the channel 24 open and allow flow of fluid therethrough.

In addition, various means such as packers, cementing and other devices are used to isolate different zones within the well. The zones may require individual stimulation. However, it is necessary to be able to determine which zones are in need of treatment and which zones are not. Further, it is necessary to have an indication of the conditions of the flow within the well or well zone.

A tagging agent composed of a radioactive material carried by an ion exchange resin provides a means of determining flow in the well and behind the well casing 4 into the earth's strata.

FIG. 1 illustrates a typical layout for treating a well. However, various other layouts are possible, depending upon the desired results and the particular individual doing the treatment.

Means to inject the tagging agent of radioactive material and resin into the pressure side of frac line 18 generally comprises a low volume, high pressure piston pump 40 having an outlet line 42 which communicates with the valve 44 to line 18. One such pump is the series 5000 pump manufactured by Texsteam Products, a Vapor Corporation Division in Houston, Texas. The pump 40 provides a mechanism for mixing the radioactive material and resin with the treatment solution.

The carrier for the radioactive material is a macroreticular ion exchange resin having an effective size of 0.10 to 1.00 millimeters or 10 to 400 mesh and a temperature range of up to 350 degrees Fahrenheit. The size effectively corresponds with that of sand typically used in fracing or acidizing operations and therefore acts as a prop when mixed with the fluid from the pumps 34. The following is a list of typical ion exchange resins which have been effectively tested but it should be appreciated that other resins may be used as well. These resins are manufactured by Rohm and Haas Company of Philadelphia:

| Amberlite | IRA-400 | Styrene-DVB |
| Amberlite | IRC-50 | Methacrylic Acid-DVB |
| Amberlite | IRA-93 | Styrene-DVB |
| Amberlite | IRA-94 | Styrene-DVB |

The Amberlite IRA-400 falls in the range of a gel type ion exchange resin being a strongly basic anion exchanger of a quaternary ammonium functionality.

Because of the unique characteristics of the resin material when mixed with water, the resin is readily adapted to being pumped as if it were a fluid. The resin flows readily like a fluid and mixes readily with other solutions and fluids.

Other types of the ion exchange resins generally fall in the category of functionality of the following groups: sulfonic, carboxylic, quaternary ammonium, and polystyrene polyamine.

The radioactive material is preferably an isotope having a half-life of 150 days or less. The use of isotopes having a short half-life of 150 days or less prevents the well and fluid produced from the well from being radioactively contaminated for long periods of time. Heretofore, isotopes generally having a half-life of 300-500 days requires the well to be shut in for several days to a few weeks to allow radioactivity in the well to reduce to a safe level. By using a short half-life of 150 days or less, the well can be allowed to flow sooner. This also reduces possible field contamination which would render other wells such as offset wells unloggable. A partial list of isotopes which are generally available from Union Carbide of Tuxedo, New York are included in the following list:

| Scandium | Sc 46 |
| Iridium | Ir 192 |
| Iodine | I 131 |
| Iodine | I 125 |
| Thulium | Th 170 |
| Zirconium/Niobium | Zr/Nb 95 |
| Cerium | Ce 141 |

A preferred combination which has been found to work reasonably well is the Amberlite IRA-400 ion exchange resin and Iridium. The resin and radioactive isotope, generally found in a chemical compound, are mixed at the well site and given ample time to chemically react. The mixture is then mixed with a quantity of refined lubricating oil of a non-detergent type, such as 30 weight non-detergent oil, which lubricates the pump 40 and seals the radioactive material within the ion exchange resin to prevent it from reacting with other materials in the well. The radioactive material and ion exchange resin are then ready to be pumped into the well 2.

The amount of radioactive isotope pumped into line 42 to line 18 equals 0.7-1.0 microcuries of the isotope per pound or gallon of treatment solution pumped by pumps 34 into the well 2. Thus, one must consider the pumping rates of both pumps to determine the quantities of tagging agent needed to tag the treatment fluid to assure the 0.7-1.0 microcuries per pound of treatment fluid are mixed.

An example of a tagging material used is composed of a solution formed in the following manner: mix 600 milliliter of Amberlite IRA-400 with a 300 milliliter solution of iridium cloride in a 10 percent hydrocloric acid solution. Allow approximately 30 minutes for the solutions to fully react. Then, the tagging agent thus formed is mixed with 1800 milliliter of non-detergent, refined motor oil preferably of 30 weight viscosity.

The first procedure in the process of treating the well is to determine the rate of base radiation which is naturally occuring within the well. Generally, scintillation counter tools are used to determine the gamma-ray radiation level of the well. In addition, a temperature sensing device is generally used in conjunction with a Geiger counter tool to make a temperature log such as that disclosed in the patent to Guinn et al, U.S. Pat. No. Reissue 27,459, issued Aug. 15, 1972. Typically, a log type recorder readily available from various suppliers, records the level of radiation at the depth of the tool within the well. The location of perforations is generally known because these are formed in the casing after the well has been cased. There are several methods of determining the depth of the tool within the well but a collar locator is generally used as a depth reference tool.

Figure 2:
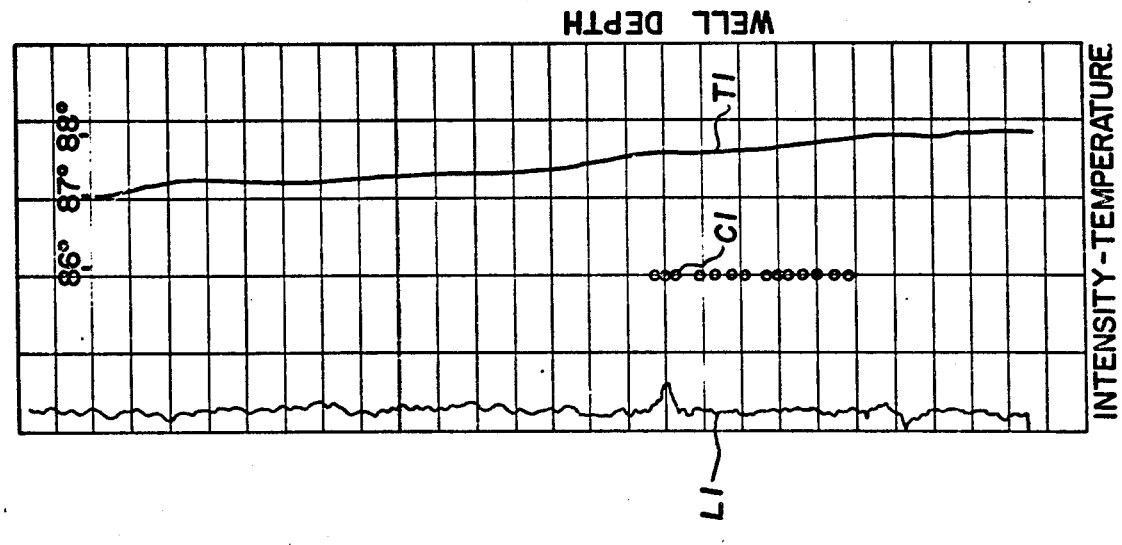
FIG. 2 is a graph illustrating a typical log prepared before any material is injected into the well.

The first procedure in forming a base gamma ray log is to shut the well in for a period of approximately 24 hours before proceeding to stabilize all operations of the well. Then, the gamma ray detection tool and temperature sensing device are lowered into the well to form a log such as illustrated in FIG. 2 of the drawing. The gamma ray readings are quite low as they reflect only natural radiation within the well.

After determining the base, it is necessary to determine where fluid will flow before injecting the acidizing material into the well. To do this, a dummy fluid such as water or gel-water are injected through frac line 18 by pump 34 into the well 2. Simultaneously, the tagging agent is injected into the dummy fluid in line 18 by pump 40 through line 42. The dummy fluid and tagging agent flows into the well 2 under high pressure, forcing its way into channels 24 through perforations 22. A second log is then made.

By studying the increased radiation levels, one can determine the quantity of fluid which has been tagged positioned at that point.

Figure 3:
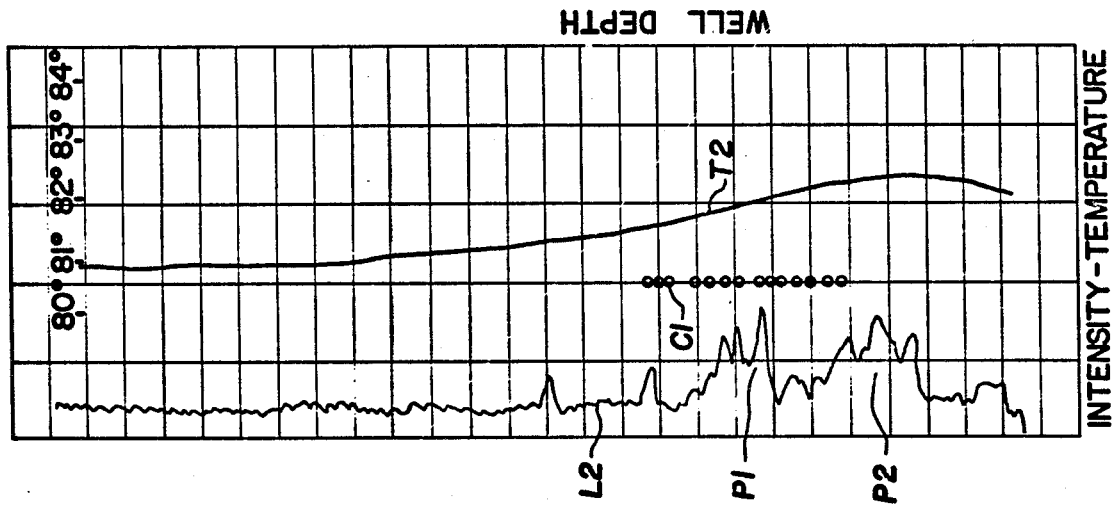
FIG. 3 is a graph illustrating a log prepared after radioactive material and dummy fluids are injected into the well.

As illustrated in FIG. 3, a typical log line L2 shows the radiation level within the well. It is noted that the peak areas P1 occur adjacent perforations 22 indicated by circles C1 on the log chart. In addition, the temperature rise indicated by line T2 occurs adjacent the perforations 22. The increased activity of radiation indicates a higher concentration of radioactive material. The increased radioactive material indicates an increase in fluid previously tagged in the channels 24 behind perforations 22. It is also noted that the peak area P2 below the perforations 22 indicated by circles C1 indicates a downward movement of fluid behind the well casing 4.

By interpreting the log, one can tell where the well is not flowing into perforations. In treating the well, one procedure is to proceed in staged increments of treating the well. To do this, a plugging material such as rock salt which is pumped into the well to seal off openings such as perforations C1 or 22 which are already open and allow flow of fluid therefrom. This material is dissolvable by heat or acid and will not effect the performance of the well at those locations. Then a quantity of the acidizing fluid, for example one-fourth of the total amount which may be 80,000 gallons can be pumped into the well under pressure while injecting a tagging agent of radioactive material and ion exchange resin simultaneously into the frac line 18. The tagging agent is mixed by the pressure at a uniform rate with the treatment solution and flows into the well 2. The treatment solution reacts on the earth's strata, parafins and other materials at those locations which have stopped up the formation to force the earth's strata open and prop same open with the sand and ion exchange resin to permit flow of fluid from the earth's strata in a manner well known in the art.

Figure 4:
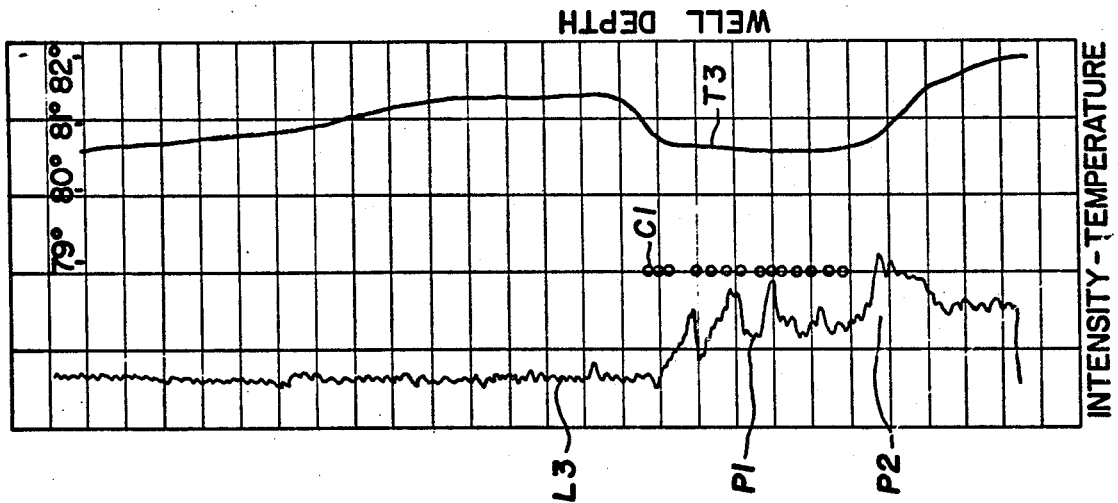
FIG. 4 is a typical log prepared after the fracturing stage of the well logging system.

After the first stage of treatment another log is run to determine where the fluid and tagging agents flowed and the effects of the treatment. As illustrated in FIG. 4, the line L3 indicates the radiation levels within the well. Line T3 indicates the temperature level. It will be readily apparent from the chart illustrated in FIG. 4 as compared to the one illustrated in FIG. 3, the peak areas P1 and P2 are now higher, indicating a greater flow of fluid into those areas.

A second treatment may be used as deemed necessary to open channels 24 further or to proceed with other zones within the well 2 which are generally located up and down the well bore. After this stage of treatment, a fourth log may be run to determine the radiation levels and flow of fluid behind the well casing 4 to determine if future and further treatments are necessary.

As is readily apparent from the log as shown in FIGS. 3 and 4, it is easy to determine where the flow of fluid has occured by employing the radioactive material.

Having described my invention, I claim:

1. A method of recording the effect of stimulating a well drilled into the earth's strata, comprising the steps of: recording the existing radiation within the well to form a base gamma-ray log; pumping fracturing liquids through a line leading into the well to fracture the strata and stimulate the flow of fluids trapped in the earth's strata; injecting a tagging agent of a radioactive material and an ion exchange resin into the fracturing fluids; the tagging agent being injected into the line downstream of where the fracturing fluids are being pumped to prevent contamination of the pumping apparatus; and recording a gamma-ray reading of the well after fracture of the strata to locate the position where the tagging agent has been deposited within the well which indicates the entry of the fracturing fluids through the well bore into the strata.

2. The method as set forth in claim 1, including the steps of: pumping a treatment solution into the well under pressure; injecting a tagging agent into the treatment solution under pressure; and recording another gamma-ray reading of the well to determine the results of the treatment solution.

3. The method as set forth in claim 2, including the steps of: pumping a second treatment solution into the well under pressure; injecting a tagging agent into the pressurized second solution; and recording another gamma-ray reading of the well after the second treatment solution is pumped into the well to determine the results of the second treatment solution.

4. The method as set forth in claim 1, including the step of selecting the radioactive material from a radioactive isotope having a half life of 150 days or less.

5. The method as set forth in claim 4, including the step of selecting the ion exchange resin to have an effective size of from 0.10 to 1.00 millimeters.

6. The method as set forth in claim 1, including the step of selecting the ion exchange resin to have an effective size of from 0.10 to 1.00 millimeters.

7. The method as set forth in claim 1, including the steps of reacting the radioactive material with the ion exchange resin prior to injection; mixing the reaction product with refined lubricating oil to seal the ion exchange resin; and injecting this mixture into the fracturing fluids and the line downstream of where the fracturing fluids are being pumped.

8. The method as set forth in claim 7, including the step of selecting the radioactive material used in the tagging agent to have a half life of 150 days or less.

9. The method as set forth in claim 7, including the step of selecting the radioactive material to be an isotope selected from the group consisting of scandium, iridium, iodine, thulium, zirconium, niobium and cerium.

10. The method as set forth in claim 9, including the step of selecting the ion exchange resin from the group consisting of sulfonic, carboxylic, quaternary ammonium, and polystyrene polyamine.

11. The method as set forth in claim 7, including the step of selecting the ion exchange resin from a group consisting of sulfonic, carboxylic, quaternary ammonium, and polystyrene polyamine.

12. The method as set forth in claim 7, including the step of selecting the ion exchange resin to have an effective size of substantially between 0.10 and 1.00 millimeters.

* * * * *